Patented Jan. 5, 1943

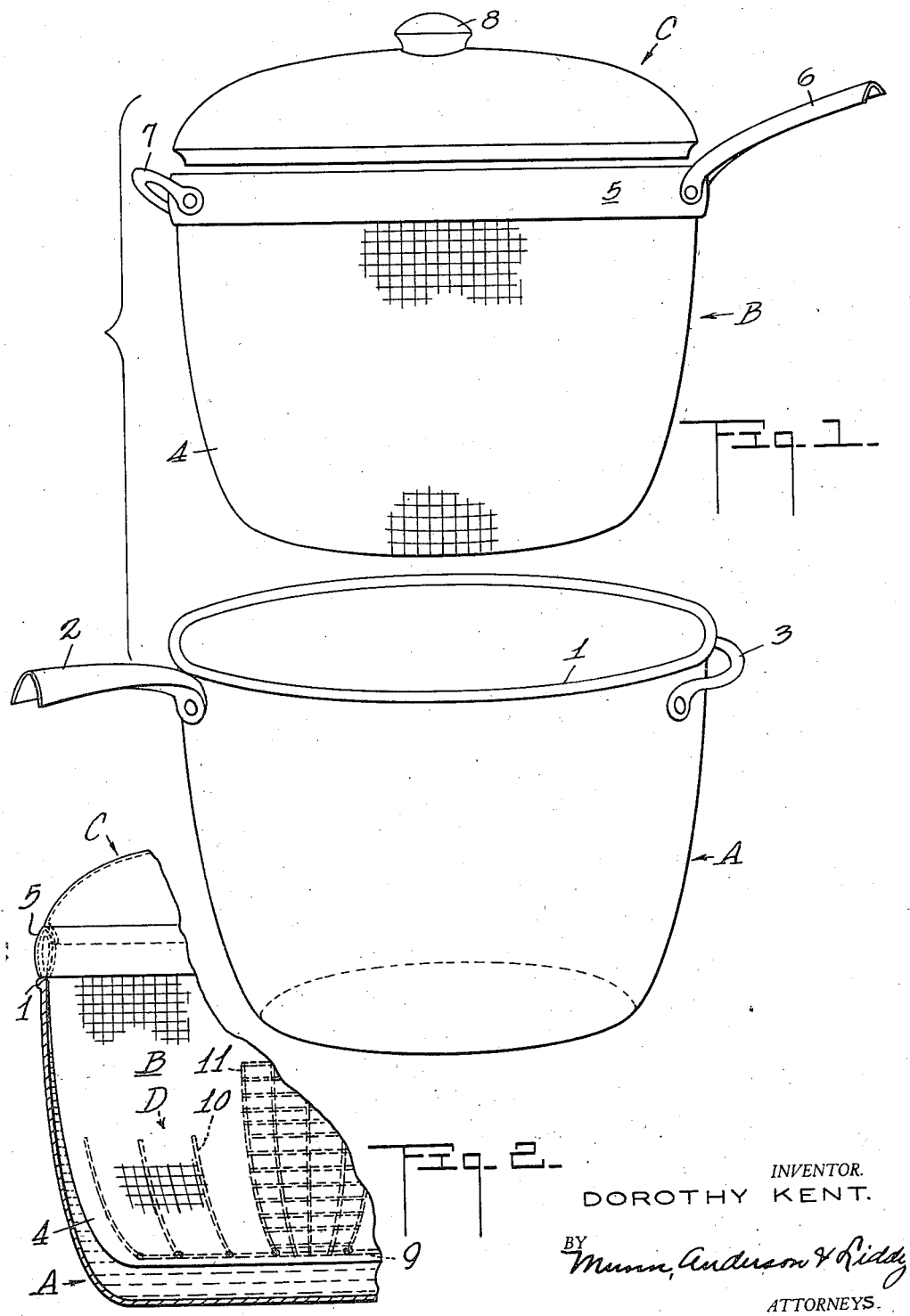

2,307,408

UNITED STATES PATENT OFFICE 2,307,408

PORTABLE HAND OPERATED DISHWASHER

Dorothy Kent, Dillon Beach, Calif.

Application June 7, 1940, Serial No. 339,333

1 Claim. (Cl. 141—9)

The present invention relates to improvements in a portable hand operated dishwasher, and it consists of the combinations, constructions and arrangements hereinafter described and claimed.

An object of my invention is to provide a portable hand operated dishwasher, which consists of a water-holding pan, a wire basket with an imperforate rim rotatably supported by the upper edge of the pan, a cover fitting snugly into the imperforate rim of the wire basket, and a dish-holding device removably mounted in the basket.

The pan and basket are provided with operating handles, which may be manually grasped and moved toward and away from each other, for causing the basket to rotate relative to the pan. This will cause the hot water and soap in the pan to move through the basket and wash the dishes supported in the dish-holding device or rack. The bottom of the basket is spaced above the bottom of the pan for permitting free movement of the water under the basket and into the latter.

Additional lifting handles are attached to the pan and basket and are preferably placed diametrically opposite the operating handles so as to cooperate therewith when lifting the basket from the pan, or the pan from the supporting surface. It will be seen that the hands of the person do not have to contact with the water during washing operations, nor when removing the basket and dishes from the pan. The device is simple in construction, durable and efficient for the purpose intended.

Other objects and advantages will appear as the specification proceeds, and the novel features of my invention will be set forth in the claim hereunto annexed.

Figure 1 is a disassembled view of the dishwasher, illustrating the pan, basket and cover; and Figure 2 a vertical sectional view taken through one side of the pan and exhibiting the parts in assembled and nested relation.

While I have shown only the preferred form of my invention, it should be understood that various changes or modifications may be made within the scope of the appended claim without departing from the spirit of the invention.

In carrying out my invention, I provide a water-holding pan A, a wire basket B and a cover C. Within the basket I removably mount a dish rack D.

The water-holding pan A has a rolled rim 1, an operating handle 2, and a lifting handle 3. The handle 2 is fairly short (about six inches long), and is stout and large enough for the operator's hand to grip it with comfort. I have shown the handle riveted to the pan, although it may be secured in any other manner desired.

The lifting handle 3 is preferably of the loop type with its ends riveted to the pan or otherwise secured thereto. This makes a closed loop handle, which cooperates with the operating handle for lifting the pan. The handle 3 does not interfere with the relative rotation between the basket and pan. The pan may be made from any suitable material, such as galvanized steel or colored enamel.

The wire basket B has a wire mesh portion 4 carried by an imperforate rim 5. The basket is shown in perspective in Figure 1. The wire mesh is small enough in size to prevent articles being washed from protruding through the basket. The wire screen 4 may be made from galvanized steel or colored enamels may be used to cover the wire. The imperforate rim 5 consists of a sheet of metal, U-shaped in cross section (see Figure 2) and receiving the top of the basket screen 4 to which it is crimped.

I do not wish to be confined to this particular manner of securing the rim to the basket, since the basket could be spun from a single sheet of metal with an imperforate rim and a perforated side and bottom wall. The underside of the rim is curved so as to readily and freely slide or rotate on the pan rim 1 when the basket is moved relative to the pan.

The basket rim 5 carries an operating handle 6 similar to the handle 2 and a lifting handle 7 similar to the handle 3. These two handles 6 and 7 are disposed diametrically opposite each other in the same manner as the handles 2 and 3 are arranged on the pan. The handles 6 and 7 do not interfere with the handles 2 and 3 when the basket is rotated with respect to the pan.

The cover or lid C is dome-shaped and has a central knob 8 designed to be readily grasped by the operator for removing the cover, which closely fits the basket rim. The dome-shaped top of the cover provides space sufficient to accommodate knife handles and large plates. Figure 2 illustrates how a steam-tight fit is formed between the cover, basket rim and top of the pan so that the operator can manipulate the device without subjecting his or her hands to any hot escaping steam.

Figure 2 discloses the dish rack D as being placed within the basket. The dish rack may be of any standard construction and is removably mounted in the basket. The rack has a wire base 9 with wire loops 10 for receiving plates, and a central wire cup-shaped container 11 for carrying the silverware and cutlery.

The weight of the dishes in the rack will hold the latter in place relative to the basket. The basket, when removed from the water pan, will act as a dish drainer.

From the foregoing description of the various parts of my dishwasher, the operation thereof may be readily understood. The dish rack is first disposed in the basket and the basket placed in the pan, whereupon the dishes may be stacked in the rack. Usually the plates, saucers, and soup dishes are scraped and stood on edge in the rack and between wire loops of the rack. The plates lean against the basket for support. The cups may be nested and arranged around the cutlery and silverware container with the handles turned downwardly.

A cloth may be placed over the cups to protect them against breakage. The smaller dishes, like egg-cups, sugar and cream sets, sauce dishes, etc., may be placed on the top of the cloth. The container 11 receives all knives, forks and spoons and holds them in a stand-up position. Sufficient hot water and soap are now added to cover the dishes, whereupon the lid is snugly forced into place.

The weight of the dishes will hold the pan against slippage while the operating handles are grasped and the operator moves the basket handle 6 toward and away from the handle 2. No clamp is needed for holding the pan against slippage. The basket handle is gently and carefully moved while the pan handle is held stationary. This will move the dishes and other articles through the steamy hot soapy water. A little practice will soon reveal how much speed and action to use.

At the end of the washing operation, the lid is removed and the basket of dishes is lifted out of the pan and may be placed in a dish pan for rinsing purposes. Hot clean rinse water can be poured over the dishes. The basket and dishes may now be set on the drain board to dry. Boiling water for washing or rinsing should not be used since it breaks thin china and thick glasses. Hot water that is not quite boiling should be used.

In the event that the dishes should have a tendency to shift in the rack during the to and fro motion, the movement may be changed to one of continuous rotation of the basket in the pan. This is accomplished by moving the handle 6 completely around the pan, creating a steady whirl of water through the basket. The close fitting of the cover on the basket prevents steam escape and controls any splashing. The basket should not be too large. Its weight, when filled with dishes, should still be light enough to permit a woman to lift the basket from the pan.

The rim of the wire basket fits on the pan rim for making a steam-tight fit and permits the smooth gliding of the basket ledge on the water pan edge. The space between the basket bottom and the pan bottom permits plenty of water to move freely.

Although I do not wish to be confined to any particular size, I have found that a basket with a rim fourteen inches (14″) in diameter and a basket depth of nine and one-half inches (9½″) placed in a pan ten inches (10″) deep will dispose the basket bottom one-half inch (½″) above the pan bottom. This gives good results with the basket bottom not exceeding eleven inches (11″) in diameter. The container 11 of the dish rack should be about six inches (6″) high. The device has been described solely as a dishwasher. It is obvious that it may be used for other purposes without any change in construction.

I claim:

A portable, hand-operated dishwasher comprising a readily liftable pan for holding a dish-cleaning fluid, the top edge of the pan constituting a raceway; an elongated handle secured to and projecting radially from the pan; a wire basket for dishes having an imperforate rim riding on the raceway and forming a steam-tight fit with the pan top edge, an elongated handle secured to and extending radially from the basket rim and lying above the first named handle with sufficient clearance to permit one handle to pass the other when the basket, supported by the pan, is rotated relatively to the pan; a dish rack disposed in the wire mesh portion of the basket for holding dishes from being jostled during rotative movement of the basket; and a cover having a flange snugly fitting inside the imperforate basket rim and forming a steam-tight fit therewith; the pan, basket and cover being so arranged that a steam-tight enclosure is provided for the basket at all times while permitting relative rotative movement between the pan and basket by grasping the pan handle and rotating the basket with respect thereto by grasping the basket handle and moving it with respect to the pan handle, whereby articles contained within the basket will be moved through the fluid in the pan and cleaned, the wire screen wall and bottom portion of the basket permitting the free flow of large quantities of fluid therethrough for washing purposes.

DOROTHY KENT.